United States Patent
Gan

(10) Patent No.: US 7,165,291 B2
(45) Date of Patent: *Jan. 23, 2007

(54) HINGE ASSEMBLY FOR PORTABLE ELECTRONIC DEVICE

(75) Inventor: Wen-Lin Gan, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 134 days.

This patent is subject to a terminal disclaimer.

(21) Appl. No.: 10/921,594

(22) Filed: Aug. 18, 2004

(65) Prior Publication Data

US 2005/0138774 A1 Jun. 30, 2005

(30) Foreign Application Priority Data

Dec. 31, 2003 (TW) .............................. 92222966 U

(51) Int. Cl.
*E05D 3/10* (2006.01)

(52) U.S. Cl. .......................................... 16/367; 16/330

(58) Field of Classification Search ................. 16/367, 16/334, 331, 351, 330, 303, 328; 248/919–923; 455/375.3–375.4, 566; 361/680–683; 348/373, 348/333.06; 379/433.12, 433.13

See application file for complete search history.

(56) References Cited

U.S. PATENT DOCUMENTS

| 6,292,980 | B1 | 9/2001 | Yi et al. | |
| 6,633,643 | B1* | 10/2003 | Ona | 379/433.13 |
| 2001/0053674 | A1* | 12/2001 | Katoh | 455/90 |
| 2003/0040288 | A1* | 2/2003 | Kang et al. | 455/90 |
| 2003/0101538 | A1* | 6/2003 | Koshikawa | 16/277 |
| 2004/0141287 | A1* | 7/2004 | Kim et al. | 361/683 |
| 2004/0200038 | A1* | 10/2004 | Kim | 16/367 |
| 2004/0244147 | A1* | 12/2004 | Qin et al. | 16/330 |
| 2004/0261224 | A1* | 12/2004 | Li et al. | 16/330 |
| 2005/0050687 | A1* | 3/2005 | Shiba | 16/367 |
| 2005/0150080 | A1* | 7/2005 | Lu et al. | 16/367 |
| 2005/0198779 | A1* | 9/2005 | Jung et al. | 16/367 |
| 2005/0283946 | A1* | 12/2005 | Huang | 16/330 |

FOREIGN PATENT DOCUMENTS

| JP | 2001355371 A | * | 12/2001 |
| WO | WO 2003033923 A1 | * | 4/2003 |
| WO | WO 2005099232 A2 | * | 10/2005 |

* cited by examiner

*Primary Examiner*—Chuck Y. Mah
(74) *Attorney, Agent, or Firm*—Wei Te Chung

(57) ABSTRACT

A hinge assembly (10) for interconnecting a main body and a cover of a portable electronic device includes a hinge housing (20), and a first hinge apparatus (30) and a second hinge apparatus (40) rotatably contained in the housing and being perpendicular to each other. The first hinge apparatus includes a cam (36) rotatably attached to the housing and fixed to the main body, and other elements housed in the housing and fixed relative thereto. The second hinge apparatus includes a boom (43), a support (41) rotatably attached to the boom and fixed to the housing, and a pair of wings (433) extending from the boom and fixed to the cover. The cover is opened relative to the main body by being rotated about an X-axis of the first hinge apparatus. The cover is then rotated relative to the housing about a Y-axis of the second hinge apparatus.

20 Claims, 5 Drawing Sheets

HINGE ASSEMBLY FOR PORTABLE ELECTRONIC DEVICE

BACKGROUND OF THE INVENTION

1. Field of the Invention

The present invention relates generally to a hinge, and more particularly to a hinge used for folding portable electronic devices.

2. Prior Art

Hinges are almost universally used in modern portable electronic devices such as mobile phones and PDAs (Personal Digital Assistants). These portable electronic devices typically comprise two housings. Hinges are used to join the two housings together, and to enable one housing to be folded upon the other one. Normally, one of the housings is called a body and contains most of the electronic components of the portable electronic device. The other housing is called a cover and contains fewer or even no electronic components.

One kind of hinge is disclosed in U.S. Pat. No. 6,292,980 issued to Young-Jin Yi et al (the '980 patent). In the '980 patent, as shown in FIG. 5, a hinge mechanism 500 includes: a cam 510 having a mountain-shaped portion 512 on one end, and a shaft portion 514 on the other end which is used for engaging a cover of the mobile phone; a corresponding cam follower 520 having a bottom wall 522; and a spring 530 used for pressing the cam follower 520 to resist on the cam 510. The cam 510, the cam follower 520 and the spring 530 are all contained in a hinge housing 540, and covered by a hinge cover 550. The hinge housing 540 and hinge cover 550 are engaged in a body of the mobile phone. In use, the mountain-shaped portion 512 moves along the bottom wall 522. The cam 510 together with the cover rotates relative to the body of the mobile phone in a predetermined direction. However, the scope of rotation of the cover is limited. Many modern portable electronic devices need a cover thereof to be able to rotate to a variety of orientations.

Therefore, a hinge with a relatively simple structure is desired to overcome the above-described limitations.

SUMMARY OF THE INVENTION

Accordingly, an object of the present invention is to provide a hinge with a relatively simple and stable unified structure, which enables front and rear surfaces of a foldable cover of a portable electronic device to be conveniently turned over.

To achieve the above-mentioned object, a hinge assembly of the present invention is for interconnecting a main body and a cover of a portable electronic device. The hinge assembly includes a hinge housing, a first hinge apparatus, and a second hinge apparatus. The hinge housing is rotatably contained in the main body, and defines a first engaging hole containing the first hinge apparatus therein, and a second engaging hole containing the second engaging hole therein. The first engaging hole is perpendicular to the second engaging hole. The first hinge apparatus includes a cam rotatably attached to the hinge housing and fixed to the main body, and other elements housed in the hinge housing and fixed relative thereto. The second hinge apparatus includes a boom, a support rotatably attached to the boom and fixed to the hinge housing, and a pair of wings extending from the boom and fixed to the cover. The cover is opened relative to the main body by being rotated about an X-axis of the first hinge apparatus. The cover is then rotated relative to the hinge housing about a Y-axis of the second hinge apparatus.

Other objects, advantages and novel features of the invention will become more apparent from the following detailed description when taken in conjunction with the accompanying drawings, in which:

DETAILED DESCRIPTION OF THE INVENTION

Figure 1:
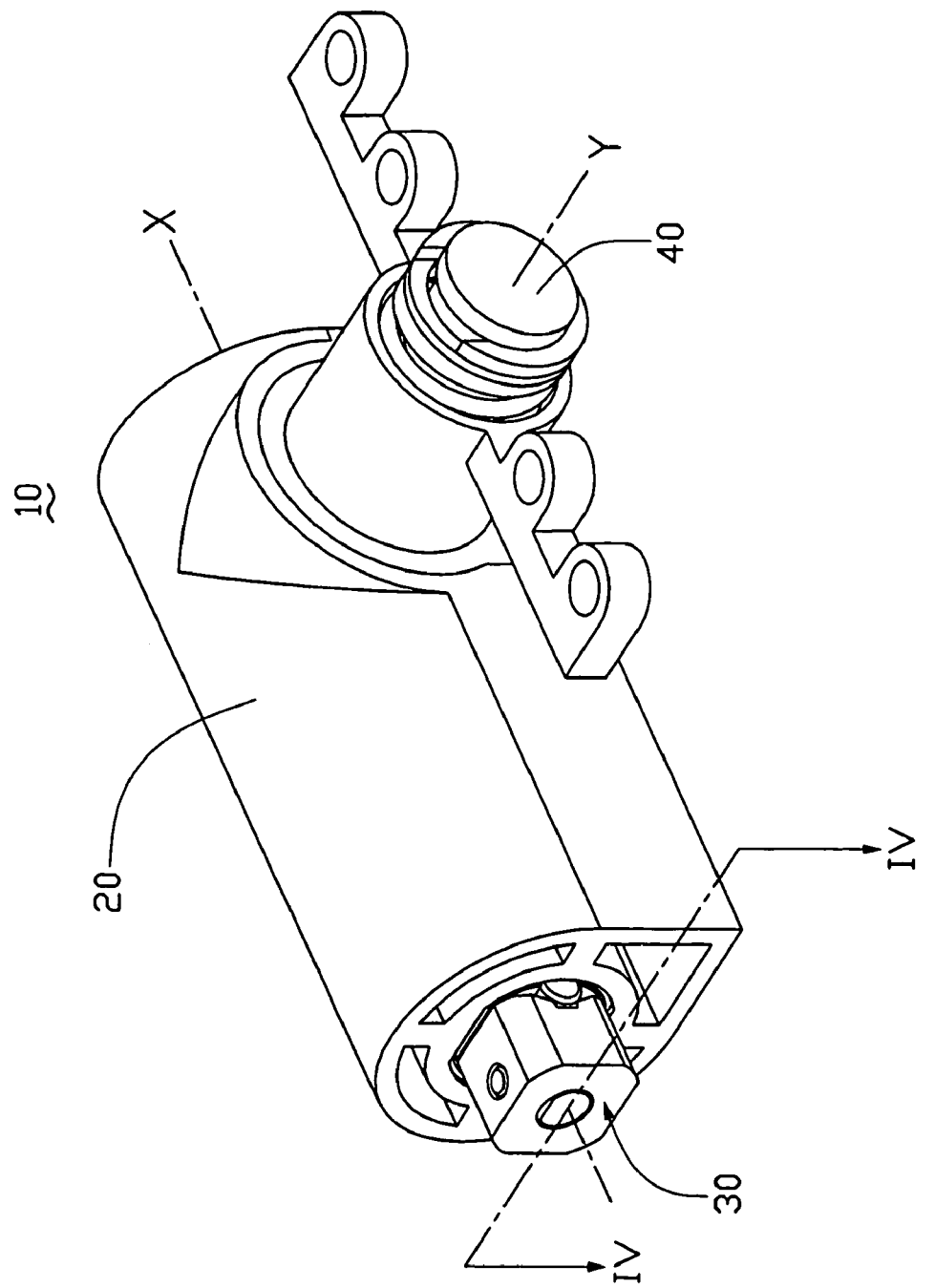
FIG. 1 is an isometric view of a hinge assembly in accordance with the present invention.

Referring to FIG. 1, an exemplary hinge assembly 10 of the present invention includes a hinge housing 20, a first hinge apparatus 30 and a second hinge apparatus 40.

Figure 2:
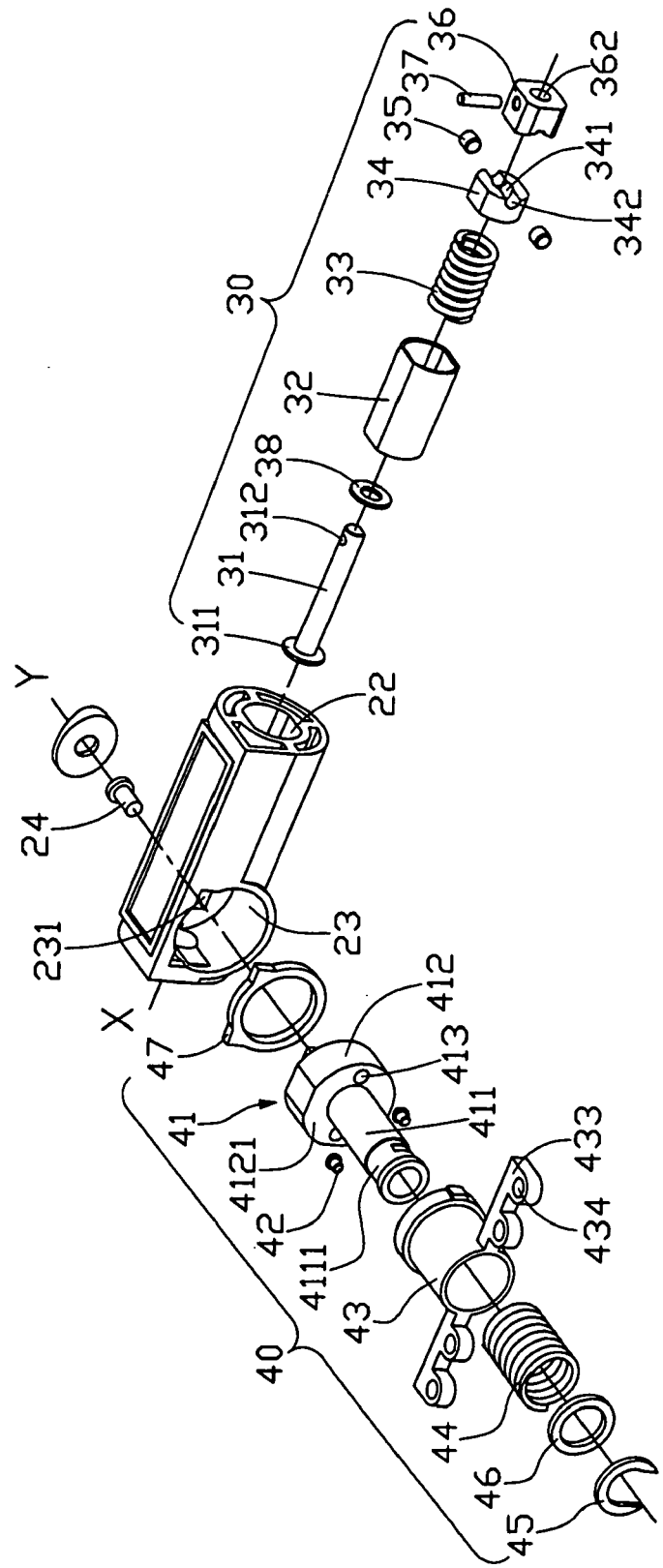
FIG. 2 is an exploded, isometric view of the hinge assembly of FIG. 1, viewed from another aspect.
Figure 3:
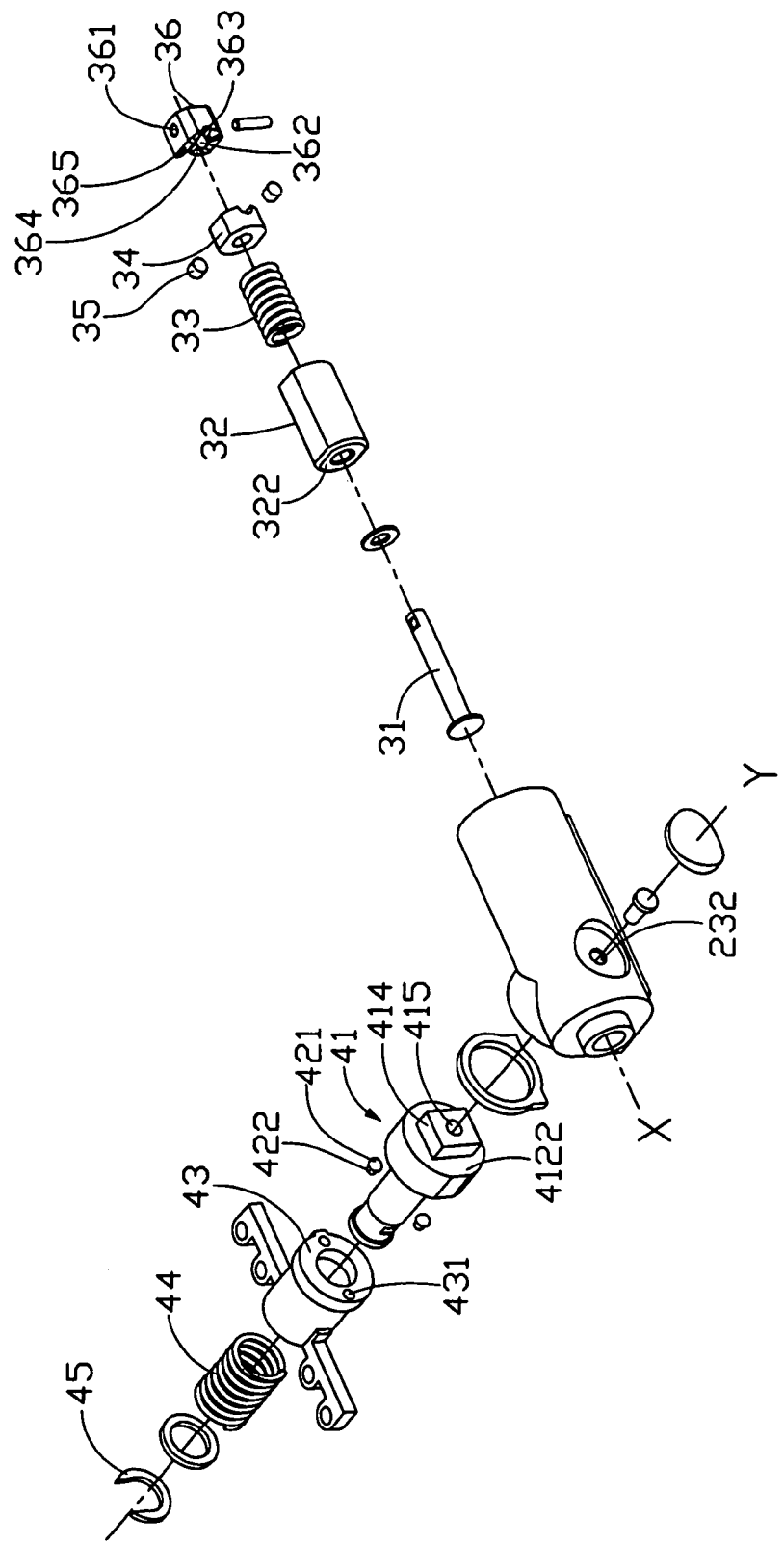
FIG. 3 is similar to FIG. 2, but viewed from still another aspect.

Referring to FIGS. 2 and 3, the hinge housing 20 of the hinge assembly 10 includes a first engaging hole 22 set along an X axis, and a second engaging hole 23 set along a Y axis. The first engaging hole 22 is used for containing the first hinge apparatus 30. The second engaging hole 23 is used for containing the second hinge apparatus 40. The second engaging hole 23 includes two round openings at two opposite sides of the hinge housing 20 respectively, and a square cavity 231 and a thin hole 232 defined in a middle portion of the hinge housing 20. One of said openings communicates with the other one through the square cavity 231 and the thin hole 232. It is to be understood that the square cavity 231 can alternatively be polygonal.

The first hinge apparatus 30 is provided for enabling a cover of a portable electronic device, such as a mobile phone, to rotate about the X-axis. The first hinge apparatus 30 includes a mandrel 31, a washer 38 (optional), a sleeve 32, a spring 33, a cam follower 34, two roller bearings 35, a cam 36, and an orientation pin 37. The mandrel 31 includes a flange 311 at one end thereof. A first through hole 312 is defined in an opposite end of the mandrel 31, and is perpendicular to the X-axis. The cam follower 34 defines a second through hole 341, and a pair of first recesses 342 at respective opposite sides of and in communication with the second through hole 341. The cam 36 defines a pair of third through holes 361 parallel with the first through hole 312, a fourth through hole 362 having a same axis as that of the second through hole 341 and being in communication with the third through holes 361, and two second recesses 363 at respective opposite sides of and in communication with the fourth through hole 362. A pair of inclines 364 is defined at respective opposite sides of each second recess 363. An upper mountain-shaped portion 365 is defined between two upper of the four inclines 364. A lower mountain-shaped portion 365 is defined between two lower of the four inclines 364. The sleeve 32 includes an annular spring clip 322 on one end thereof, corresponding to the flange 311. An outer diameter of the sleeve 32 is slightly less than an inner diameter of the first engaging hole 22.

The second hinge apparatus 40 is provided to enable the cover of the mobile phone to rotate about the Y-axis. The second hinge apparatus 40 includes a support 41, two nails 42, a boom 43, a spring 44, a washer 46 (optional), and a C-shaped spring clip 45. The support 41 includes a hollow column 411 extending from a base 412, thereby forming a step surface 4121 therebetween. Two opposite pits 413 are defined in the surface 4121. The base 412 has an end surface 4122, which is opposite to the step surface 4121. A square block 414 extends from the end surface 4122. An orientation hole 415 is defined in an end surface of the square block 414, corresponding to the thin hole 232 of the square cavity 231. Each nail 42 includes a hemispherical head 421, and a post 422. An outer diameter of the hemispherical head 421 is slightly larger than an inner diameter of the corresponding pit 413, so that the hemispherical head 421 can substantially and removably engage in the pit 413. The boom 43 is a hollow sleeve with two wings 433 extending from one end thereof, and is used for containing the support 41. The boom 43 defines two bores 431 in an end surface thereof, corresponding to the pits 413 of the support 41. An inner diameter of the boom 43 is greater than an outer diameter of the hollow column 411 of the support 41. The boom 43 forms an internal step surface 432 (see FIG. 4) at said end thereof, for retaining an end of the spring 44 thereat. The wings 433 each define a pair of fixing holes 434 therein, for connection of the wings 433 to the mobile phone. The spring 44 is located around the hollow column 411 of the support 41, and is contained in the boom 43. The spring clip 45 is engaged in a round groove 4111 of the hollow column 411.

Figure 4:
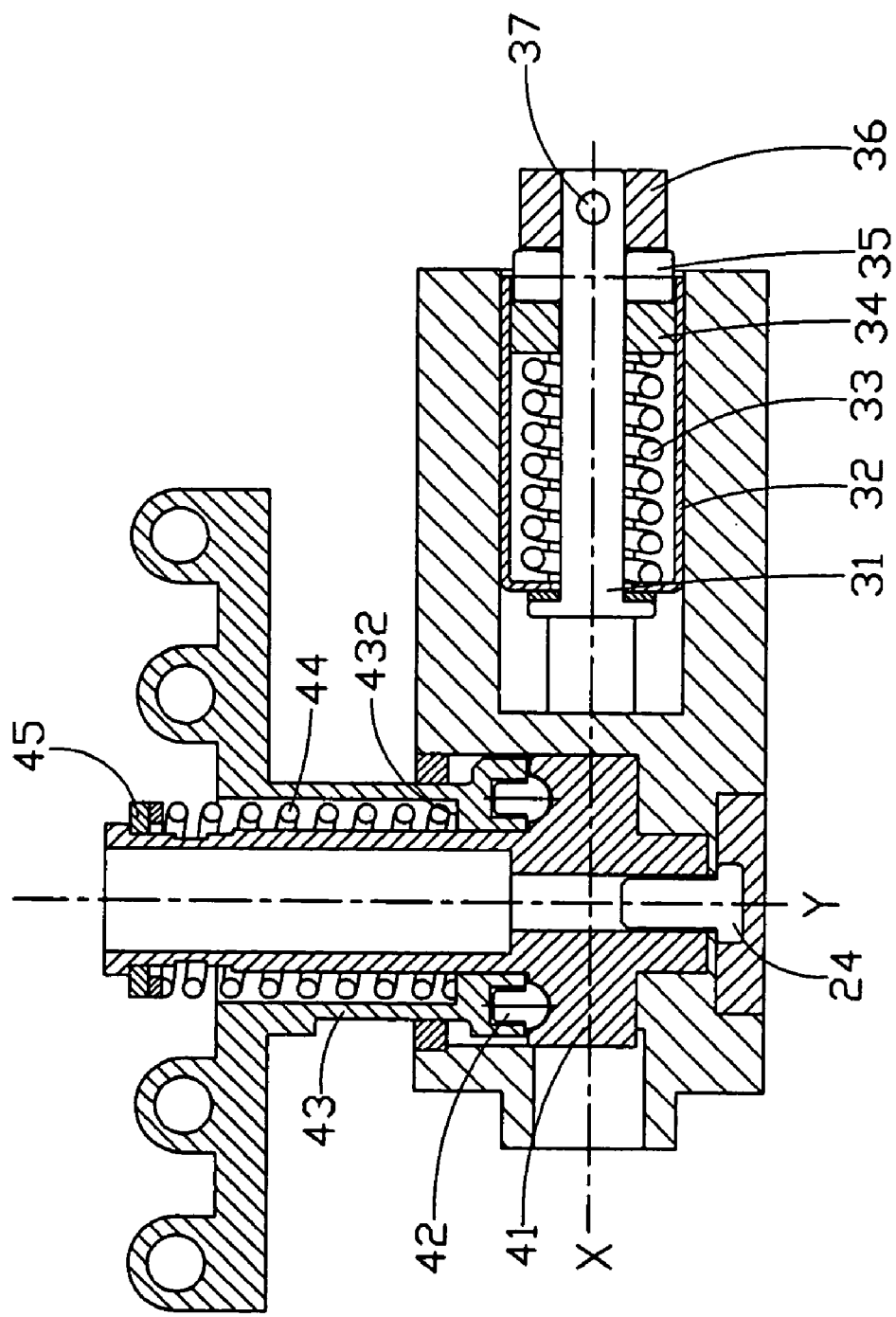
FIG. 4 is a cross-sectional view taken along line IV—IV of FIG. 1.
Figure 5:
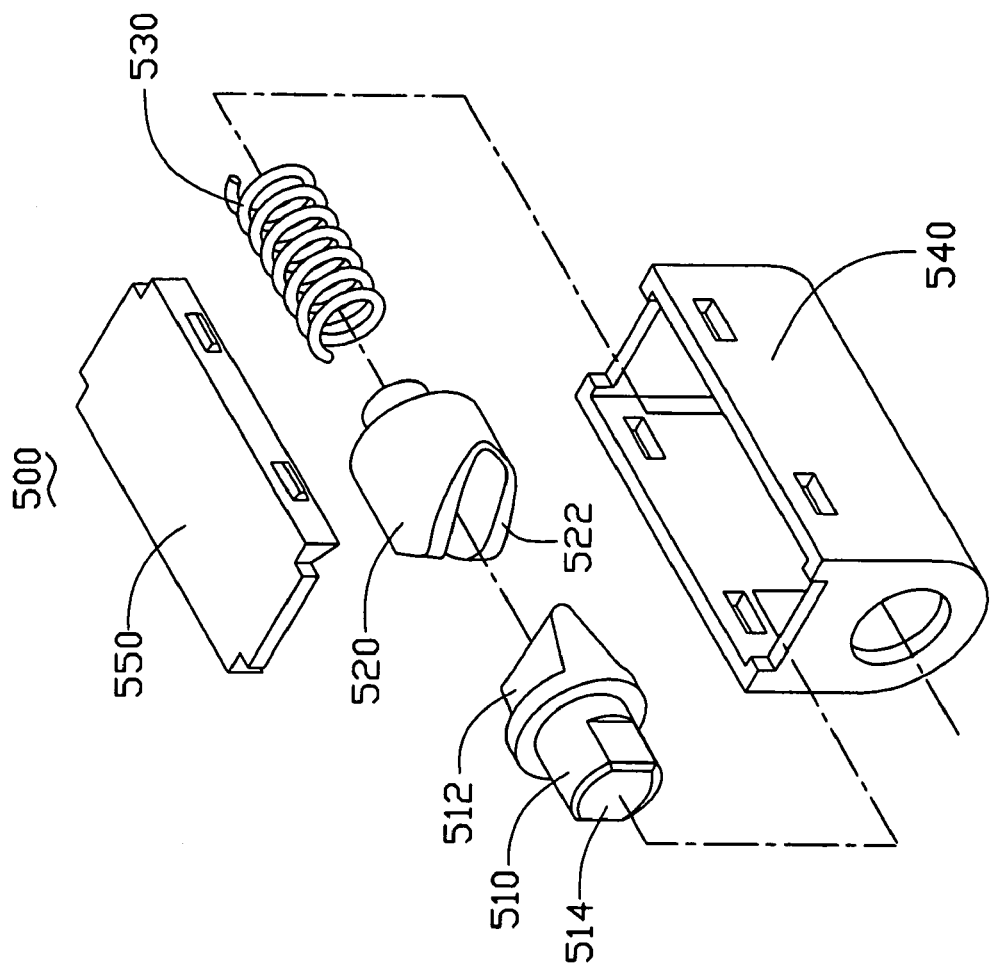
FIG. 5 is an exploded, isometric view of a hinge of the prior art.

Referring to FIG. 4, the hinge assembly 10 is assembled in two independent stages. One stage is assembly of the first hinge apparatus 30, and the other stage is assembly of the second hinge apparatus 40. In assembly of the first hinge apparatus 30, first, the mandrel 31 is sequentially inserted through the washer 38, the sleeve 32, the spring 33, the second though hole 341 of the cam follower 34, and the fourth through hole 362 of the cam 36. Then the flange 311 of the mandrel 31 is pressed against the annular spring clip 322 of the sleeve 32. The roller bearings 35 are respectively received in a pair of cavities cooperatively defined by the first recesses 342 of the cam follower 34 and the second recesses 363 of the cam 36. Next, the flange is pushed so that the spring 33 is slightly compressed, and the orientation pin 37 is received in the third through holes 361 of the cam 36 and the first through hole 312 of the mandrel 31. Finally, the sleeve 32 with all the above-described parts attached thereto is contained in the first engaging hole 22 of the hinge housing 20. The washer 38 prevents abrasion between the flange 311 of the mandrel 31 and the annular spring clip 322 of the sleeve 32.

In assembly of the second hinge apparatus 40, first, the support 41 is received in the second engaging hole 23 of the hinge housing 20, with the square block 414 of the base 412 engaged in the square cavity 231. Then a spike 24 is inserted through the thin hole 232 of the square cavity 231 and fixed in the orientation hole 415 of the square block 414, thereby fastening the square block 414 in the hinge housing 20. Next, the boom 43 is engaged around the hollow column 411 of the support 41. The hemispherical heads 421 are removably engaged in the pits 413 of the base 412, and the posts 422 are engaged in the bores 431. Finally, the spring 44 is received in the boom 43 around the hollow column 411 of the support 41. One end of the spring 44 abuts the step surface 432 of the boom 43. The washer 46 is received around the round groove 4111 of the hollow column 411. The spring 44 is compressed slightly, so that the spring clip 45 can be engaged in the round groove 4111. Thus the opposite end of the spring 44 resiliently abuts the washer 46. The second hinge apparatus 40 is thus assembled. The washer 46 prevents abrasion between the spring clip 45 and the spring 44. Further, a seal 47 (optional) can also be provided in the second engaging hole 23 for airproofing.

When the hinge assembly 10 is assembled in the mobile phone, the hinge housing 20 is received in a cavity of a main body of the mobile phone. The cam 36 of the first hinge apparatus 30 is fixed in the main body, and the wings 433 are fixed to the cover of the mobile phone. Thus the hinge housing 20 can rotate in the main body around the X-axis, with the cam 36 remaining stationary relative to the main body, and the wings 433 rotating the cover relative to the main body.

When the cover is opened, the hinge housing 20 is rotated around the X-axis, with the roller bearings 35 of the first hinge apparatus 30 rotating on the corresponding inclines 364 out from the second recesses 363, and the spring 33 being compressed in the sleeve 32. Then the roller bearings 35 slide across the mountain-shaped portions 365 of the cam 36, and along corresponding inclines 364 into corresponding second recesses 363, with the spring 33 decompressing in the sleeve 32. Thus the cover is stopped in a predetermined open position that is 180° from its original position. It is to be understood that more pairs of the second recesses 363 can be defined in the cam 364 to provide a variety of predetermined open positions for the cover.

When the cover is rotated so that it changes direction relative to the hinge housing 20, the wings 433 rotate around the Y-axis, and the nails 42 of the second hinge apparatus 40 disengage from the pits 413 and slide along the step surface 4121. The spring 44 is compressed in the boom 43 during this process. The nails 42 finally engage in corresponding pits 413, and the spring 44 decompresses to its original position. The cover is thus stopped in a predetermined orientation that is 180° from its original orientation. It is to be understood that more pits 413 can be defined in the step surface 4121 in order to provide more predetermined orientations for the cover.

The process of closing the cover is substantially the reverse of the above-described processes of rotating the cover and opening the cover.

In an alternative embodiment, the spring 44 can be located around the boom 43, with one end of the spring 44 abutting an external step surface (not labeled) of the boom 43, and the opposite end thereof abutting the washer 46. In such configuration, the wings 433 extend from an opposite end of the boom 43 that has the external step surface. In addition, the nails 42 and the boom 43 can be formed as a single integrated body. That is, the boom 43 includes two hemispherical heads formed on an end surface thereof. Furthermore, the support 41 and the hinge housing 20 can be formed as a single integrated body. Moreover, the first hinge apparatus 30 used for interconnecting the cover and the main body can be replaced by a known hinge mechanism.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A hinge assembly for interconnecting a main body and a cover of a portable electronic device, comprising:
   a hinge housing rotatably attached to the main body, and defining a first engaging hole and a second engaging hole perpendicular to the first engaging hole:

a first hinge apparatus contained in the first engaging hole for enabling the cover to open relative to the main body; and a second hinge apparatus contained in the second engaging hole, for enabling the cover to rotate about an axis perpendicular to the hinge housing after the cover is opened relative to the main body;

wherein the first hinge apparatus comprises a mandrel with a first spring member disposed therearound, a cam biased by the first spring member, a cam follower, two roller bearings rotatably set between the cam and the cam follower, an orientation pin connecting the cam and the mandrel together, and a sleeve containing the mandrel, the first spring member, the cam follower and the two roller bearings therein, and the cam and the cam follower receive the mandrel therethrough, the sleeve is received in the hinge housing, and the cam is disposed outside of the sleeve and is adapted to be fixed to the main body.

2. The hinge assembly as claimed in claim 1, wherein the second hinge apparatus comprises a support with a second spring member disposed therearound, and a boom rotatably engaged around the second spring member and the support, and the boom is adapted to be fixed to the cover.

3. The hinge assembly as claimed in claim 2, wherein the support comprises a base and a column extending from the base, the column defines a round groove in an end thereof spaced apart from the base, and a spring clip is provided in the round groove.

4. The hinge assembly as claimed in claim 3, wherein the spring clip is generally C-shaped.

5. The binge assembly as claimed in claim 2, wherein a wing extends from the boom, and said wing defines a fixing hole therein.

6. The hinge assembly as claimed in claim 2, wherein the boom defines a step surface therein, and the step surface is biased by the second spring member.

7. The hinge assembly as claimed in claim 2, wherein the support further comprises a block extending from an end of the base for securing the second hinge apparatus in the second engaging hole.

8. The hinge assembly as claimed in claim 2, wherein the second hinge apparatus further comprises a nail engaged with the support and the boom.

9. The hinge assembly as claimed in claim 2. wherein the support comprises a base and a column extending from the base, a step surface is formed between the base and the column, a pit is defined in the step surface, a bore is defined in an end surface of the boom, and the second hinge apparatus further comprises a nail engaged in the pit of the support and the bore of the boom.

10. A hinge assembly for interconnecting a main body and a cover of a portable electronic device, comprising:

a binge housing rotatably attached to the main body, and comprising a first engaging hole and a second engaging hole perpendicular to the first engaging bole;

a first hinge apparatus contained in the first engaging hole, for enabling the cover to open relative to the main body; and a second binge apparatus contained in the second engaging hole, for enabling the cover to rotate about an axis perpendicular to the hinge housing after the cover is opened relative to the main body;

wherein the second hinge apparatus comprises a support fixed relative to the hinge housing, a spring member disposed around the support, a boom rotatably covering the spring member and the support and being fixed relative to the cover and a nail engaged with the support and the boom.

11. The hinge assembly as claimed in claim 10, wherein the support comprises a base, a column extending from an end of the base, and a block extending from an opposite end of the base.

12. The hinge assembly as claimed in claim 11, wherein the block is wedged in the second engaging bole of the hinge housing.

13. The hinge assembly as claimed in claim 11, wherein a hole is defined in an end surface of the block, and the second hinge apparatus further comprises a spike received in the hole of the block.

14. The hinge assembly as claimed in claim 10, wherein the second hinge apparatus further comprises a sprirg clip.

15. The hinge assembly as claimed in claim 14, wherein the spring clip is generally C-shaped.

16. The hinge assembly as claimed in claim 10. wherein a wing extends from the boom, and said wing defines a fixing hole therein.

17. The hinge assembly as claimed in claim 10, wherein the boom defines a step surface therein, and the step surface is biased by the spring member.

18. The hinge assembly as claimed in claim 10, wherein the support comprises a base and a column extending from the base, a step surface is formed between the base and the column, a pit is defined in the step surface, a bore is defined in an end surface of the boom, and the nail is engaged in the pit of the support and the bore of the boom.

19. The hinge assembly as claimed in claim 18, wherein the nail comprises a head and a post, the head is engaged in the pit of the support, and the post is engaged in the bore of the boom.

20. A hinge assembly for interconnecting a main body and a cover of a portable electronic device, comprising:

a hinge housing rotatably attached to the main body, and defining an engaging hole; and a hinge apparatus contained in the engaging hole for enabling the cover to open relative to the main body;

wherein the hinge apparatus comprises a mandrel with a spring member disposed therearound, a cam biased by the spring member, a cam follower, two roller bearings rotatably set between the cam and the cam follower, an orientation pin connecting the cam and the mandrel together, and a sleeve containing the mandrel, the spring member, the cam follower and the two roller bearings therein and the cam and the cam follower receive the mandrel therethrough, the sleeve is received in the hinge housing, and the cam is disposed outside of the sleeve and is adapted to be fixed to the main body.

* * * * *